US007731770B2

(12) United States Patent
Strutt et al.

(10) Patent No.: US 7,731,770 B2
(45) Date of Patent: Jun. 8, 2010

(54) SEPARATING APPARATUS

(75) Inventors: Benjamin John Strutt, Newcastle Upon Tyne (GB); Robin Eddington, Diss Norfolk (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 162 days.

(21) Appl. No.: 11/658,601

(22) PCT Filed: Jul. 6, 2005

(86) PCT No.: PCT/GB2005/002666

§ 371 (c)(1), (2), (4) Date: Jan. 26, 2007

(87) PCT Pub. No.: WO2006/010881

PCT Pub. Date: Feb. 2, 2006

(65) Prior Publication Data

US 2008/0302071 A1 Dec. 11, 2008

(30) Foreign Application Priority Data

Jul. 29, 2004 (GB) ................................. 0416903.3

(51) Int. Cl.
*B01D 50/00* (2006.01)

(52) U.S. Cl. ............................ 55/337; 55/346; 55/343; 55/342; 55/345; 55/DIG. 3; 15/353

(58) Field of Classification Search .................. 55/337, 55/346, 343, 342, 345, DIG. 3; 15/353
See application file for complete search history.

(56) References Cited

U.S. PATENT DOCUMENTS

| | | | | |
|---|---|---|---|---|
| 2,252,581 A | | 8/1941 | Saint-Jacques | |
| 2002/0020154 | A1* | 2/2002 | Yang | 55/337 |
| 2002/0029436 | A1* | 3/2002 | Hawkins et al. | 15/339 |
| 2002/0170432 | A1* | 11/2002 | Cartellone | 95/268 |
| 2003/0177602 | A1* | 9/2003 | Courtney | 15/339 |
| 2004/0111824 | A1 | 6/2004 | Vuijk | |
| 2004/0144070 | A1* | 7/2004 | Gammack et al. | 55/343 |
| 2004/0211025 | A1* | 10/2004 | Jung et al. | 15/353 |
| 2005/0050678 | A1* | 3/2005 | Oh et al. | 15/353 |
| 2005/0160554 | A1* | 7/2005 | Ueyama et al. | 15/353 |
| 2005/0172585 | A1* | 8/2005 | Oh et al. | 55/345 |
| 2005/0172586 | A1* | 8/2005 | Oh et al. | 55/345 |
| 2005/0223520 | A1* | 10/2005 | Greene et al. | 15/353 |

(Continued)

FOREIGN PATENT DOCUMENTS

EP 0 972 573 A1 1/2000

(Continued)

*Primary Examiner*—Jason M Greene
*Assistant Examiner*—Dung Bui
(74) *Attorney, Agent, or Firm*—Morrison & Foerster LLP

(57) ABSTRACT

A separating apparatus includes a shroud that has a wall having a multiplicity of through-holes. At least one baffle is provided on the inner surface of the wall of the shroud. The baffle directs the airflow entering the shroud towards the central region of the shroud, thereby reducing conflicting air currents. The baffle may also be used to assist correct assembly of the separating apparatus. The baffle may be arranged to locate with a member provided on another component of the separating apparatus, such as a cyclone assembly, in order to locate that assembly in a predetermined orientation.

23 Claims, 8 Drawing Sheets

U.S. PATENT DOCUMENTS

2005/0229554 A1* 10/2005 Oh et al. ........................ 55/346
2005/0241101 A1* 11/2005 Sepke et al. .................. 15/353
2005/0252179 A1* 11/2005 Oh et al. ........................ 55/337
2005/0252180 A1* 11/2005 Oh et al. ........................ 55/345
2006/0037291 A1* 2/2006 Oh et al. ........................ 55/337
2006/0053757 A1* 3/2006 Han et al. ...................... 55/337
2006/0059871 A1* 3/2006 Han et al. ...................... 55/345
2006/0075728 A1* 4/2006 Oh et al. ........................ 55/345
2006/0085943 A1* 4/2006 Gammack et al. ............. 15/323
2006/0102005 A1* 5/2006 Oh et al. ........................ 96/385
2006/0107629 A1* 5/2006 Oh .............................. 55/345
2006/0117520 A1* 6/2006 Choi ........................... 15/352
2006/0117721 A1* 6/2006 Lee et al. ...................... 55/337
2006/0162299 A1* 7/2006 North .......................... 55/345
2006/0168922 A1* 8/2006 Oh .............................. 55/337
2007/0079579 A1* 4/2007 Eddington et al. ............ 55/337
2007/0084159 A1* 4/2007 Oh et al. ........................ 55/337
2008/0134462 A1* 6/2008 Jansen et al. .................. 15/347
2008/0264009 A1* 10/2008 Lee et al. ...................... 55/345
2008/0289140 A1* 11/2008 Courtney et al. .............. 15/353

FOREIGN PATENT DOCUMENTS

GB 2 169 822 7/1986
GB 2 355 391 4/2001
GB 2 384 451 7/2003

* cited by examiner

SEPARATING APPARATUS

REFERENCE TO RELATED APPLICATIONS

This application is the national stage under 35 USC 371 of International Application No. PCT/GB2005/002666, filed Jul. 6, 2005, which claims priority from British Application No. GB 0416903.3, filed Jul. 29, 2004, the contents of which are incorporated herein by reference.

FIELD OF THE INVENTION

The invention relates to separating apparatus for separating dirt and dust from an airflow. Particularly, but not exclusively, the invention relates to separating apparatus suitable for use in a cyclonic vacuum cleaner.

BACKGROUND OF THE INVENTION

It is known to provide vacuum cleaners with cyclonic separating apparatus for separating dirt and dust from an airflow. It is also known to provide such separating apparatus with two cyclones arranged in series, the upstream cyclone arrangement being of relatively low efficiency and the downstream cyclone arrangement being of higher efficiency. It has been found to be beneficial if a so-called shroud is positioned at the outlet to the upstream cyclone in such an arrangement. This positioning of the shroud has been adopted in vacuum cleaners manufactured and sold by Dyson Limited.

A shroud is commonly formed by providing a wall having a large number of perforations or through-holes which communicate on their upstream side with the separating chamber of the upstream cyclone. The through-holes of the shroud thus form the outlet from the separating chamber.

A problem which may be encountered with conventional separating apparatus is that, as dirt- and dust-laden air is pulled through the shroud, eddy air currents may be set up on the inner surface of the shroud, which turbulence may cause dirt and dust to be re-entrained in the airflow or to gather on the inner surface of the shroud.

SUMMARY OF THE INVENTION

The invention provides separating apparatus comprising a separating chamber and a shroud forming an outlet from the separating chamber, the shroud comprising a wall having a multiplicity of through-holes, further comprising at least one radially inwardly extending baffle on the inner surface of the wall, immediately downstream of the through-holes.

The provision of an internal baffle or fin directs the airflow entering the shroud towards the central region of the shroud, thereby reducing conflicting air currents. The baffle is located immediately downstream of the through-holes and thus has a positive effect on the airflow as soon as it exits the shroud.

Advantageously, a plurality of baffles is provided on the inner surface of the wall of the shroud, extending radially inwardly.

At least one of the baffles may be arranged to co-operate with a member associated with another component of the separating apparatus, such as the cyclone assembly, to locate that component in a predetermined position and/or orientation. This feature assists in the manufacturing process of the separating apparatus. An operator on the assembly line can use this feature in order to align the component in a correct orientation with respect to the shroud.

BRIEF DESCRIPTION OF THE DRAWINGS

The invention will now be described, by way of example, with reference to the accompanying drawings, in which.

Like reference numerals refer to like parts throughout the specification.

DETAILED DESCRIPTION OF THE INVENTION

Figure 1A:
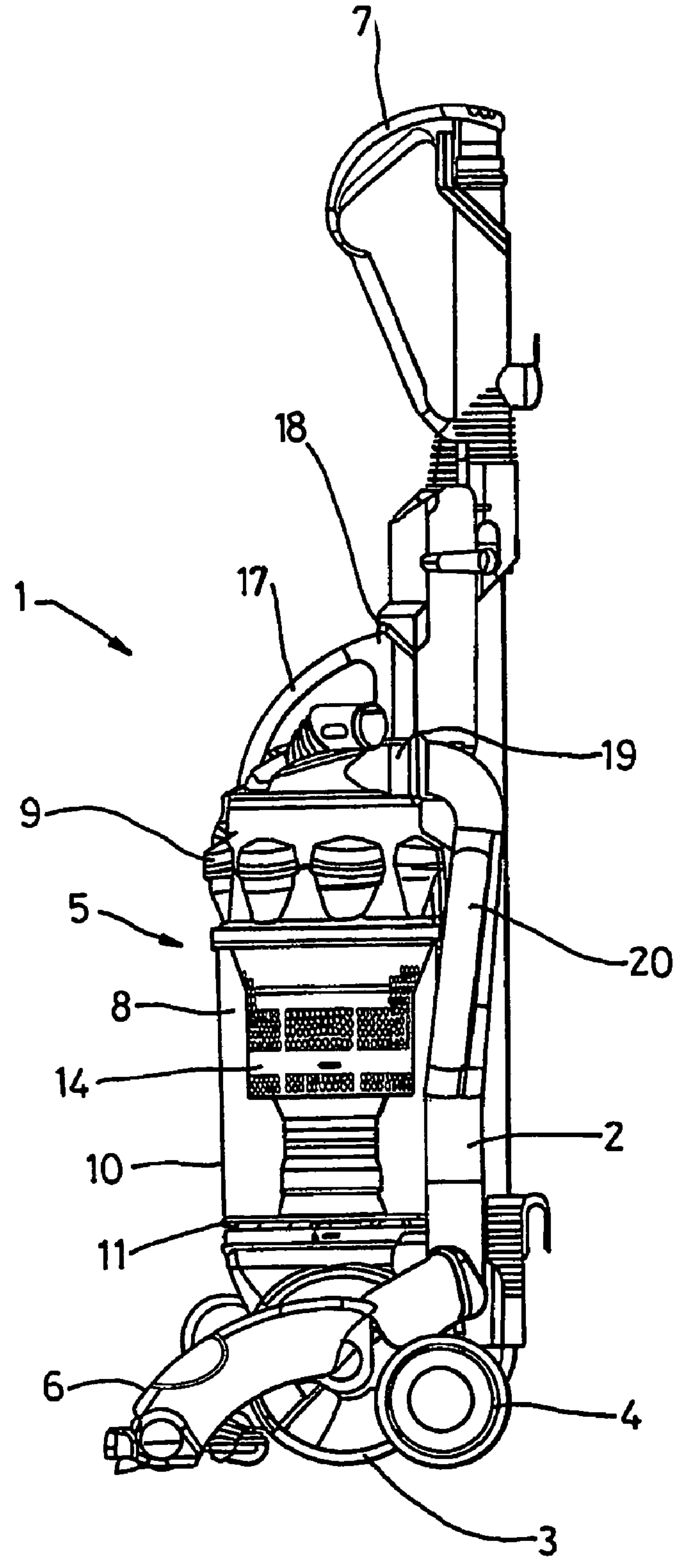
FIGS. 1*a* and 1*b* are side views of a vacuum cleaner incorporating separating apparatus constructed according to the invention.
Figure 1B:
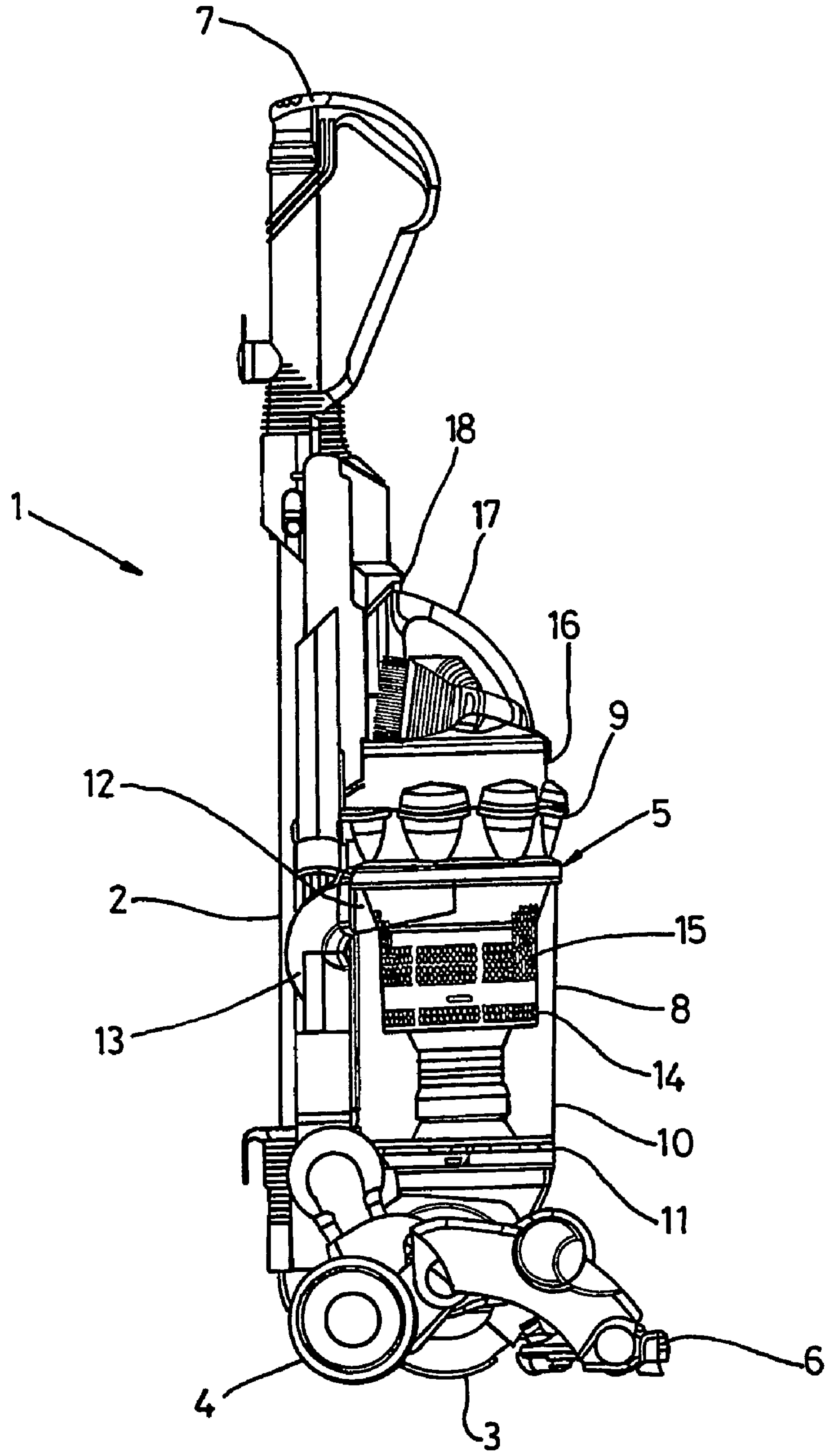

A vacuum cleaner incorporating a separating apparatus according to the invention is shown in FIGS. 1*a* and 1*b* and is indicated generally by the reference numeral 1. The upright vacuum cleaner 1 has a main body 2, which includes a motor casing 3, supporting wheels 4 and dirt- and dust-separating apparatus 5. The vacuum cleaner 1 also has a cleaner head 6 and a handle assembly 7. In the embodiment shown, the dirt- and dust-separating apparatus 5 comprises a cyclonic arrangement.

The cyclonic separation apparatus 5 comprises a single upstream cyclone 8 and a downstream cyclone assembly 9 comprising a plurality of downstream cyclones 9*a* to 9*g*. The upstream cyclone 8 consists essentially of a cylindrical bin 10 having a closed base 11. An inlet port 12 is provided in the cylindrical bin 10 in order to allow dirty air to be introduced to the interior of the upstream cyclone 8. The inlet port 12 is shaped, positioned and configured to communicate with upstream ducting 13 which carries dirt-laden air from the cleaner head 6 to the cyclonic separating apparatus 5.

The base 11 of the cylindrical bin 10 can be hingedly connected to the remainder of the cylindrical bin in order to provide further access to the interior of the bin for emptying purposes if required. A mechanism may be provided for allowing the base 11 to be opened in order to allow emptying of dirt and dust.

A shroud is located in an upper portion of the upstream cyclone 8. The shroud 14 has a perforated portion 15 allowing air to pass from the interior of the upstream cyclone 8 to an air passageway that communicates with the downstream cyclone assembly 9.

The downstream cyclone assembly 9 comprises seven identical downstream cyclones 9*a* to 9*g* inclusive that are equi-angularly spaced about a central longitudinal axis, which is coincident with the longitudinal axis of the upstream cyclone 8. Each cyclone 9*a* to 9*g* has a respective inlet arranged in the manner of a scroll so that air entering each downstream cyclone 9*a* to 9*g* is forced to follow a helical path within the respective cyclone.

The uppermost ends of the downstream cyclones 9 project inside a collection moulding 16 which extends upwardly from the surfaces of the downstream cyclone assembly 9. The collection moulding 16 supports a handle 17 by means of which the entire cyclonic separation apparatus 5 can be transported. A catch 18 is provided on the handle 17 for the purposes of securing the cyclonic separation apparatus 5 to the upstanding body 2 at the upper end thereof. An outlet port 19 is provided for conducting cleaned air out of the cyclonic separating apparatus 5. The outlet port 19 is arranged and configured to co-operate with downstream ducting 20 for carrying the cleaned air to the motor casing 3.

In use, the vacuum cleaner 1 is maneuvered across a surface to be cleaned by means of the handle assembly 7. A suction fan (not shown) mounted in the main body 2 and driven by the motor (not shown) draws an airflow into the cleaner 1 via the cleaner head 6, from where it passes to the separating apparatus 5. In the separating apparatus 5, the air passes into the upstream cyclone 8 and follows a helical path thus depositing dirt and dust in the bin 10. The partially cleaned air then exits the upstream cyclone 8 via the shroud 14 and passes to the downstream cyclones 9 where fine dirt and dust is separated out. The cleaned airflow is then ducted past the motor for cooling purposes and through a final filter (not shown) before exiting the appliance to the atmosphere.

Figure 2:
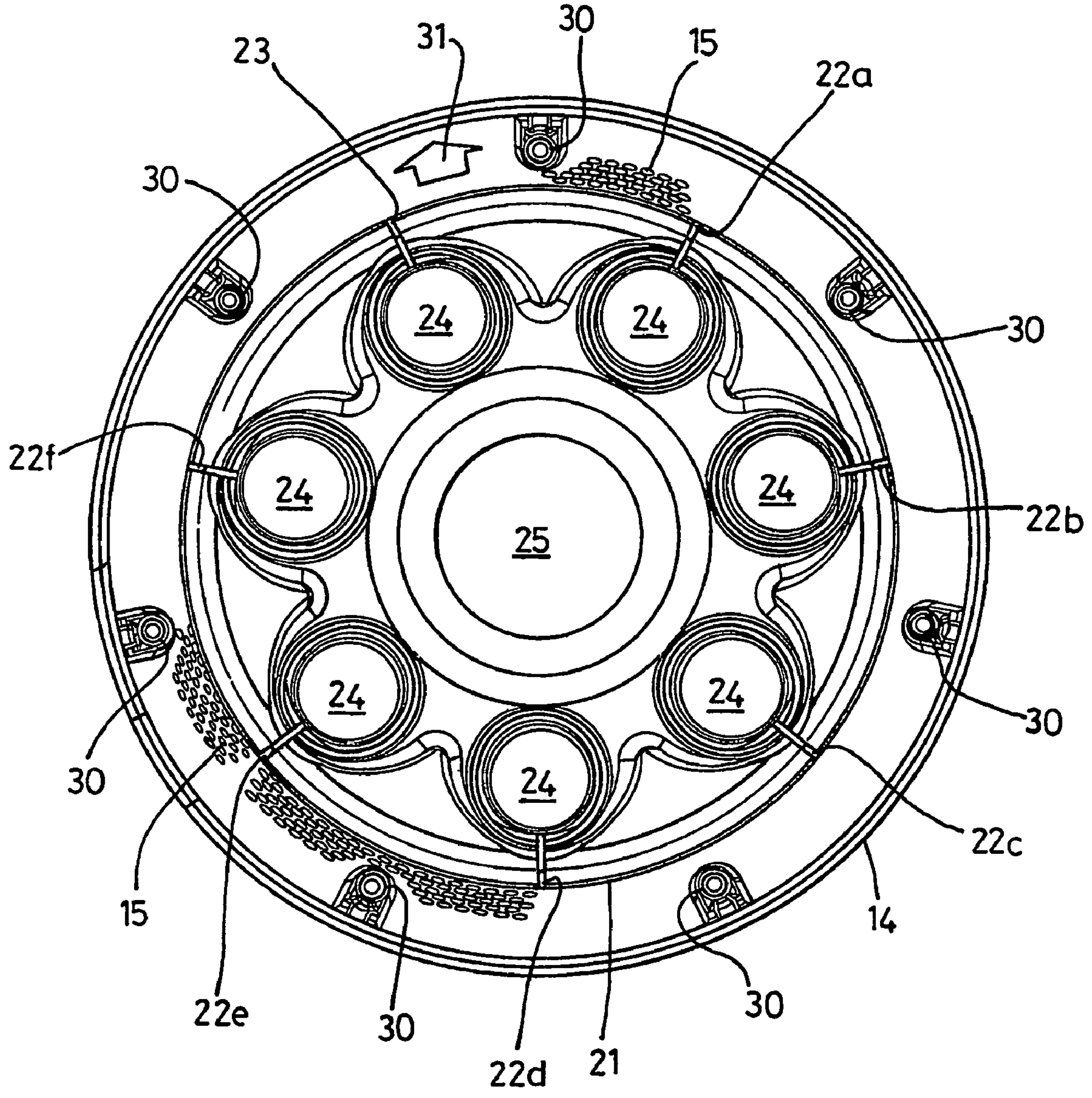
FIG. 2 is a plan view of the shroud of the separating apparatus of FIG. 1.
Figure 3:
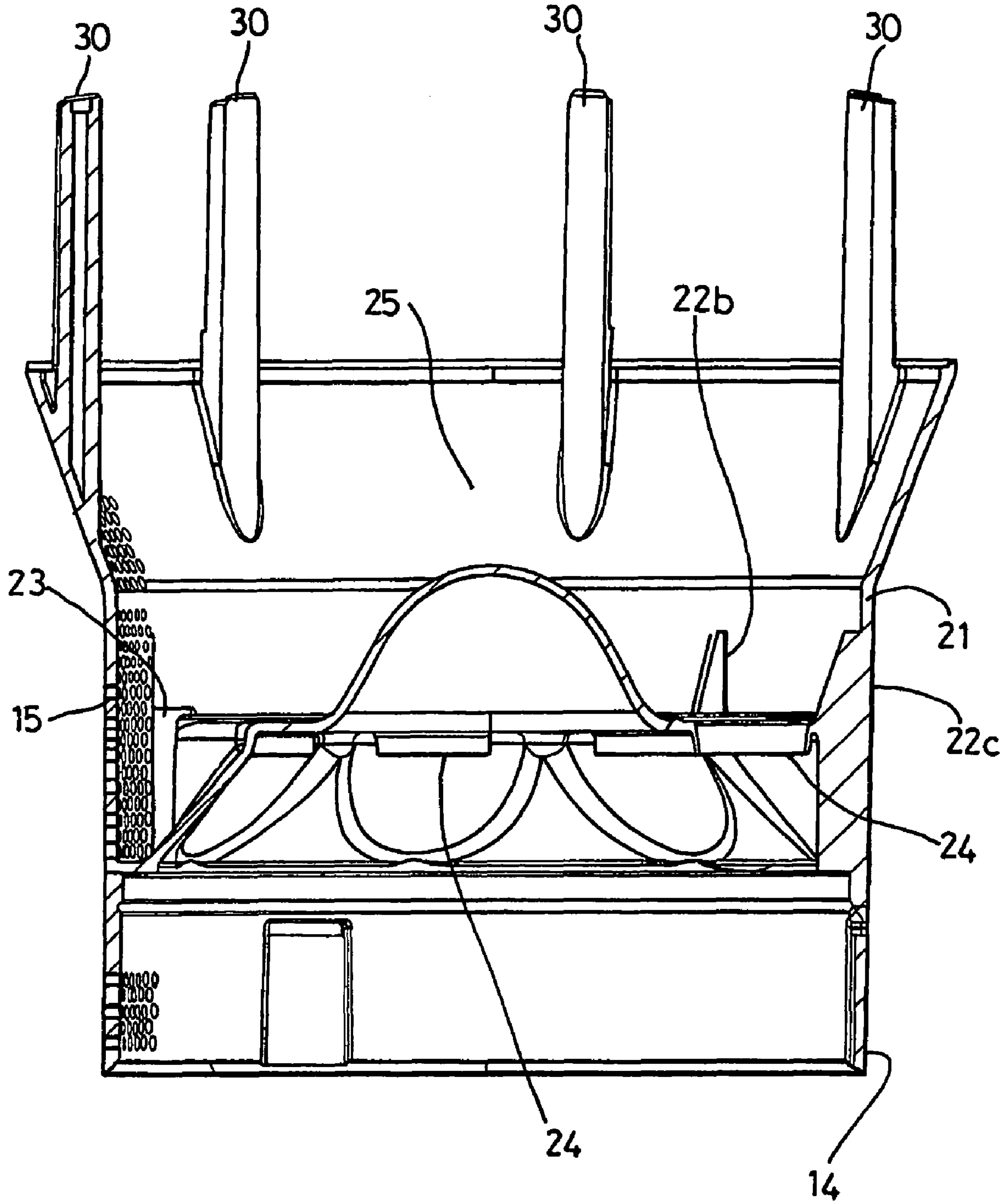
FIG. 3 is a partly sectional side view of the shroud of FIG. 2.
Figure 4:
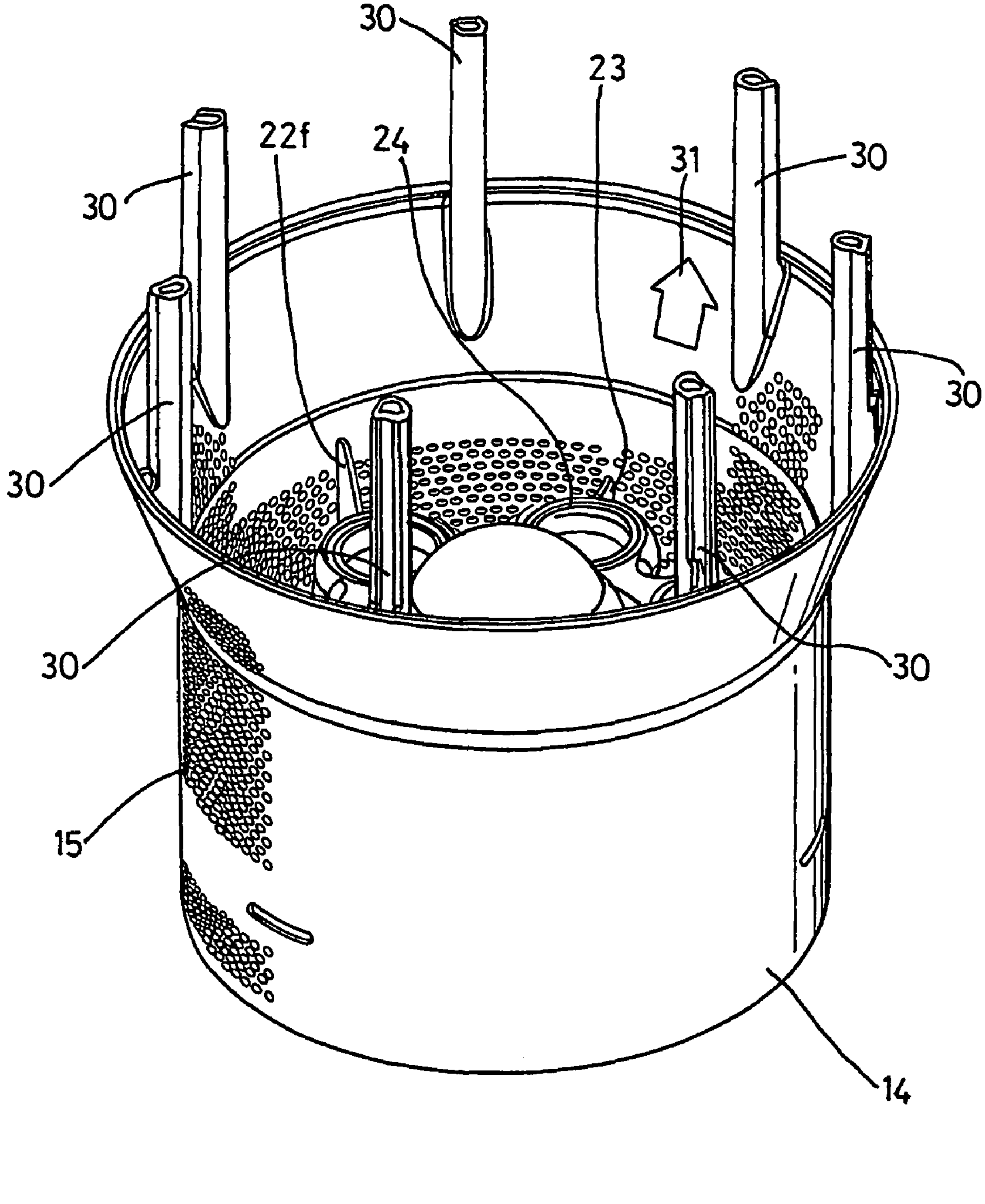
FIG. 4 is a perspective view from above of the shroud of FIGS. 2 and 3.

The shroud 14 is shown in greater detail in FIGS. 2, 3 and 4. In accordance with the invention, the inner surface of the wall 21 of the shroud 14 has a fin or baffle 22 depending from it. In the embodiment shown in FIGS. 2, 3 and 4, a plurality of fins or baffles **22*a* to 22*f* and 23 are provided. The baffles 22, 23 project radially inwardly from the inner wall 21, adjacent the perforated region 15 of the shroud 14. The baffles 22, 23 are regularly spaced around the interior of the shroud 14 and are located adjacent respective ports 24, which ports serve to locate respective end portions of the downstream cyclone assembly, as will be described later in the specification. In this embodiment, the baffles 22, 23 are formed integrally with the shroud 14**.

Figure 5A:
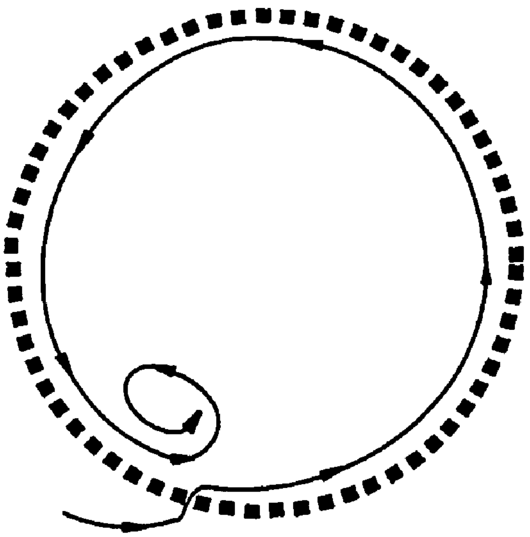
Fig. 5a (PRIOR ART)
FIG. 5*a* is a schematic plan view of the shroud of prior art separating apparatus.
Figure 5B:
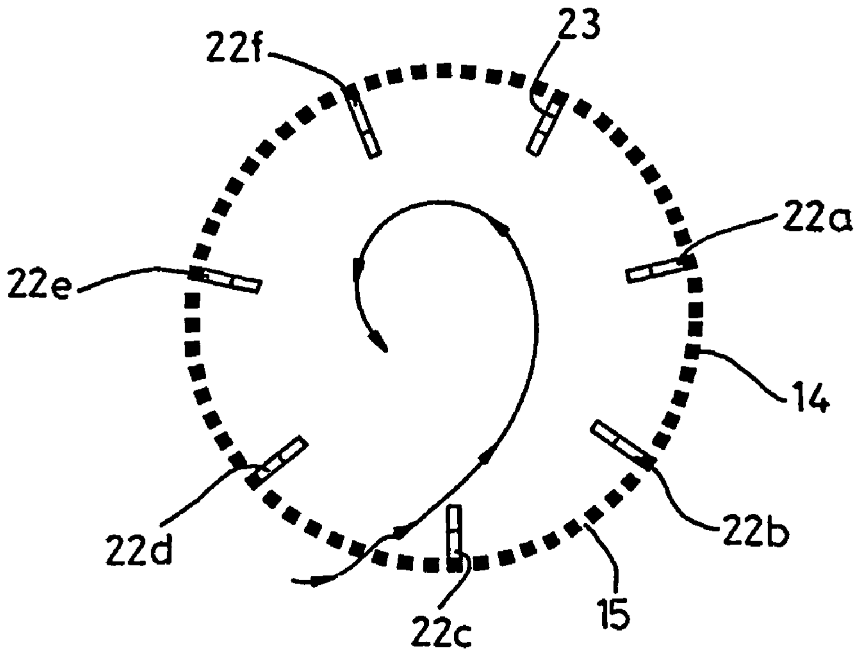
FIG. 5*b* is a schematic plan view of the shroud of FIGS. 2, 3 and 4.

The airflow entering the shroud 14 via the perforated portion 15 has a tangential velocity component, as is shown in FIGS. **5*a* and 5*b*. FIG. 5*a* illustrates a typical airflow in a prior art shroud. Previously, the tangential component of airflow tended to set up circulating air currents around the interior wall 21 of the shroud 14. These circulating currents would then meet the airflow coming into the shroud 14 through the perforations 15**, and the resulting turbulence tended to set up eddy currents against the inner wall of the shroud. These turbulent eddy currents caused the fine dirt and dust still carried by the airflow to be deposited on the region of wall adjacent the eddy currents. Thus, the fine dirt and dust had a tendency to build up against the shroud and so block the through-holes.

With the separating apparatus of the invention, as shown in FIG. **5*b*, the tangential airflow exiting the perforations 15 encounters the baffles 22*a* to 22*f* and 23. The fins or baffles serve to direct the tangential component of airflow towards the centre 25 of the shroud assembly and into a central conduit that communicates with the ends of the downstream cyclones 9**. Hence, the airflow tends to follow a more helical path, reducing the likelihood of air currents conflicting and adversely affecting each other. The eddy currents previously encountered are thereby reduced and the airflow passes more smoothly into the inlets to the downstream cyclones. Thus, the fins or baffles serve to reduce the accumulation of dirt and dust in the interior of the shroud.

In accordance with a further aspect of the invention, one 23 of the baffles is of a different shape from the others **22*a* to 22*f*: it is shorter, not extending axially as far along the inner wall as the other baffles. This shortened baffle 23 is provided in order to assist in the assembly of the separating apparatus during manufacture. The shortened baffle is arranged to co-operate with a member provided on the cyclone assembly 9**, in order to locate the downstream cyclone assembly in a predetermined position and orientation with respect to the shroud.

Figure 6:
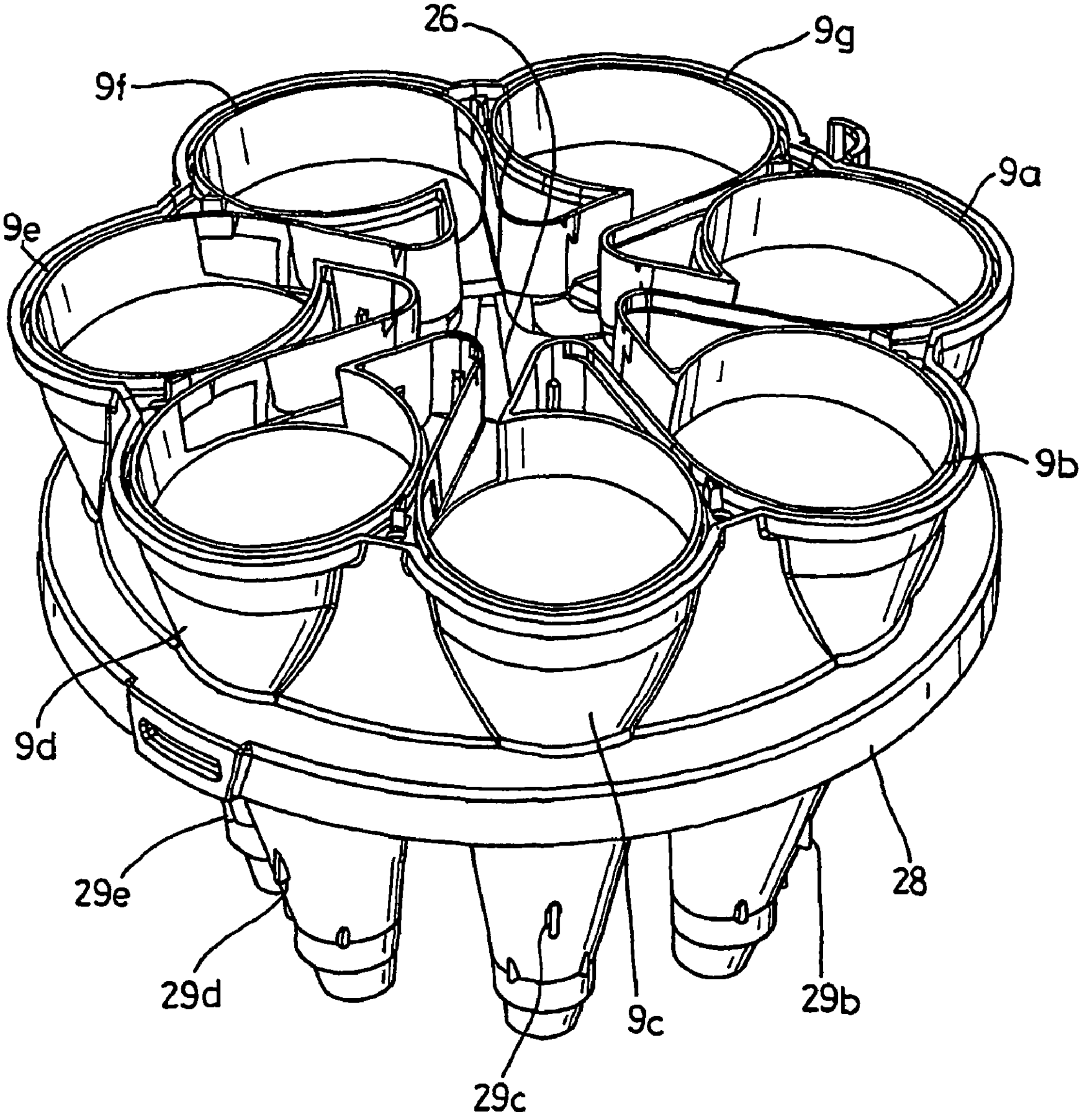
FIG. 6 is a perspective view from above of part of the cyclone assembly of the separating apparatus of FIG. 1.
Figure 7:
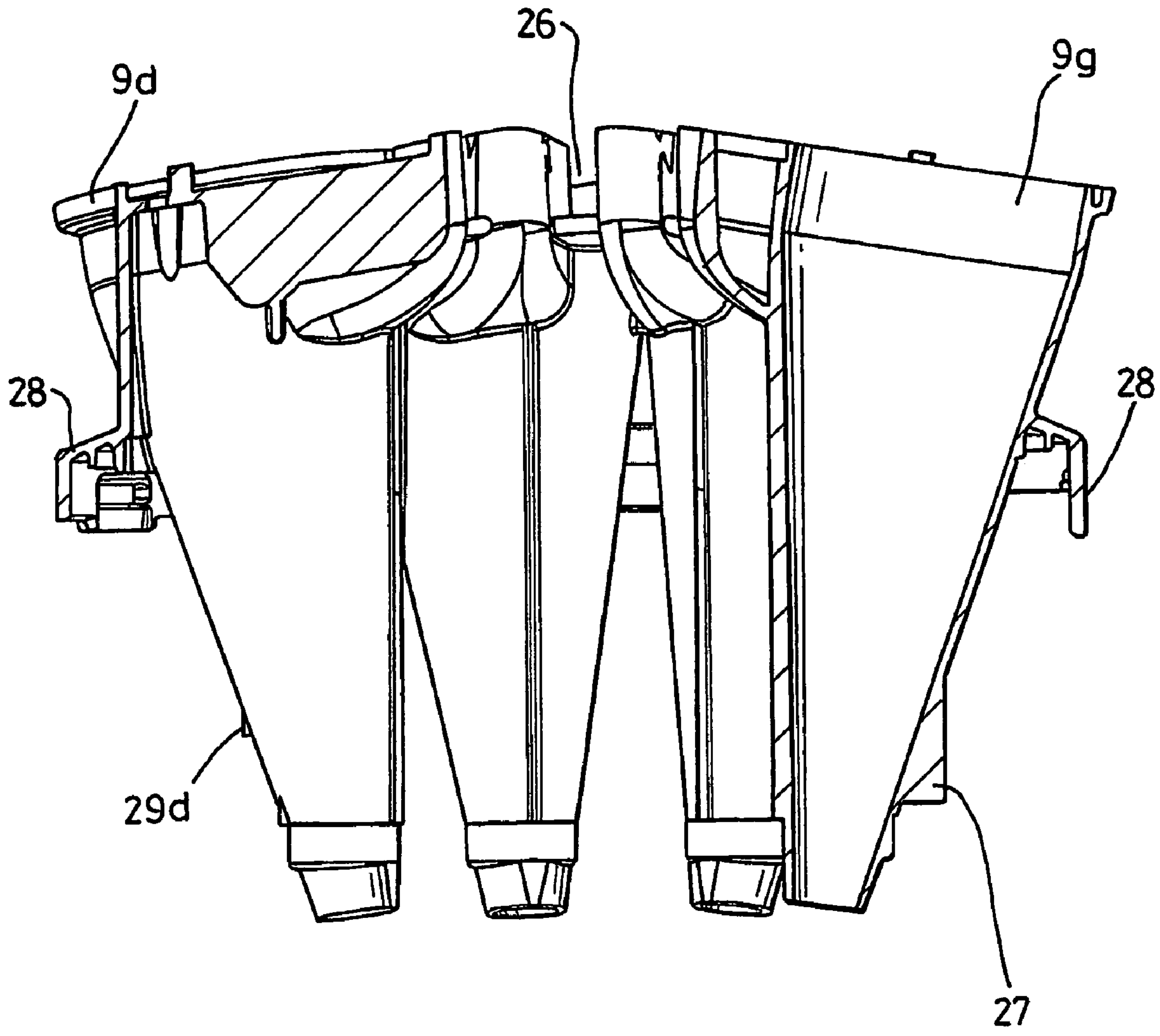
FIG. 7 is a partly sectional side view of the part of the cyclone assembly of FIG. 6.

The downstream cyclone assembly 9 is shown in greater detail in FIGS. 6 and 7. The cyclone assembly 9 comprises a plurality of parallel cyclones **9*a* to 9*g* arranged around a central opening 26 forming part of the conduit that communicates with the inlets of the respective cyclones. Each downstream cyclone 9*a* to 9*g* is frusto-conical in shape with the smaller end thereof located lowermost and the larger end uppermost. Each downstream cyclone 9*a* to 9*g* has a longitudinal axis which is inclined slightly towards the longitudinal axis of the downstream cyclone 8**, the angle being typically of the order of 7.5°.

A fin-like member 27 is provided on the outer wall of one of the downstream cyclones on the downstream cyclone assembly 9. This member 27 is arranged to co-operate with and fit against the smaller baffle 23 on the shroud 14 so that the cyclone assembly 9 fits within the shroud in a particular orientation. If the user tries to drop the cyclone assembly 9 into the shroud 14 in a different orientation, with the cyclone assembly rotated about its longitudinal axis, the fin member 27 will abut the upper surface of one of the larger baffles 22. Thus, the cyclone assembly 9 will not be in its predetermined location but will instead sit higher. A lip 28 on the cyclone assembly 9 will be spaced from the upper surface of the wall of the shroud 14. This alerts the operator to the fact that the cyclone assembly 9 is not fitted to the shroud 14 correctly. This sub-assembly cannot then be attached to the remainder of the separating apparatus 5 until the incorrect orientation of the cyclone assembly is corrected by rotating the cyclone assembly about its longitudinal axis to the correct position.

When the cyclone assembly 9 is in the correction orientation, the cyclone assembly sits lower in the shroud 14. The lip 28 of the cyclone assembly 9 sits flush against the top surface of the shroud wall. The fin-like member 27 sits in, and completes the profile of, the smaller baffle 23 on the inner surface 21 of the shroud wall. Each of the other cyclones has a smaller fin **29*a* to 29*f* on its outer wall that is supported by the top surface of the respective baffle 22*a* to 22*f* when the components are brought together. Upwardly directed legs 30 on the upper surface of the wall of the shroud are arranged to fit in sockets (not shown) in the cyclone assembly 9. The lower, narrower end portions of the cyclones fit inside respective ones of the ports 24 provided in the shroud 14**.

In order to facilitate correct fitting of the cyclone assembly 9 to the shroud 14, a visual indicator in the form of an arrow 31 is provided on the shroud. This indicates to the operator that, by aligning the fin member 27 of the cyclone assembly 9 with the arrow 31, the components will slot automatically into their correct relative positions.

The invention helps to prevent the build-up of dirt and dust inside the shroud. Such a build-up could block the perforations in the shroud or cause re-entrainment of dirt into the airflow. Furthermore, the region between the cyclone assembly and the upper portion of the shroud may not be accessible to the user, and so cannot be removed easily. With the separating apparatus of the present invention, dirt and dust is carried to the downstream cyclones, where it is separated efficiently from the airflow and deposited in the collecting chamber, which the user can easily empty.

Variations may be made without departing from the scope of the invention. For example, the baffles need not be located adjacent the ports provided for the downstream cyclone assembly and need not be regularly spaced around the interior of the shroud. The number of baffles does not need to equal the number of cyclones.

The baffles may project into the shroud by differing amounts, and the projection need not be solely radial. The baffles may be contoured to further assist directing the airflow into the central region that communicates with the conduit providing inlets to each cyclone.

More than one of the baffles may be arranged to co-operate with further fin-like members on the cyclone assembly in order to locate the assembly in a correct position. Of course, the invention is not limited to locating the cyclone assembly: the invention may be used to locate other components with respect to the shroud.

The baffle on the shroud may co-operate with a notch, catch or other suitable mechanism provided on the other component as an alternative to the fin member.

The baffles may be an integral part of the shroud or may be formed separately. Likewise, the fin member on the cyclone assembly may be formed integrally with it, or may be affixed separately.

The invention has been described with respect to an upright cyclonic vacuum cleaner, but is equally applicable to cylinder or any other domestic appliance incorporating separating apparatus. Further variations will be apparent to the person skilled in the art.

The invention claimed is:

1. A separating apparatus comprising:

a separating chamber;

a shroud forming an outlet from the separating chamber; and a central conduit, the shroud comprising a wall having a multiplicity of through-holes and at least one radially inwardly extending baffle on the inner surface of the wall immediately downstream of the through-holes, wherein in use the at least one radially inwardly extending baffle directs airflow towards the central conduit.

2. The separating apparatus of claim 1, wherein the baffle is configured so as to co-operate with a member associated with another component of the separating apparatus to locate the another component in a predetermined position.

3. The separating apparatus of claim 1, wherein a plurality of the radially inwardly extending baffles is provided on the inner surface of the wall of the shroud.

4. The separating apparatus of claim 3, wherein at least two of the baffles are located immediately downstream of the through-holes.

5. The separating apparatus of claim 3 or 4, wherein at least two of the baffles extend radially inwardly from the inner wall.

6. The separating apparatus of claim 3 or 4, wherein at least one of the baffles is configured so as to co-operate with a member associated with another component of the separating apparatus to locate the another component in a predetermined position.

7. The separating apparatus of claim 5, wherein at least one of the baffles is configured so as to co-operate with a member associated with another component of the separating apparatus to locate the another component in a predetermined position.

8. The separating apparatus as claimed in claim 6, in which the predetermined position includes a predetermined orientation.

9. The separating apparatus as claimed in claim 6, wherein the another component comprises part of a cyclone assembly.

10. The separating apparatus as claimed in claim 9, wherein the cyclone assembly comprises a plurality of parallel cyclones.

11. The separating apparatus as claimed in claim 2, in which the predetermined position includes a predetermined orientation.

12. The separating apparatus as claimed in claim 2, wherein the another component comprises part of a cyclone assembly.

13. The separating apparatus as claimed in claim 12, wherein the cyclone assembly comprises a plurality of parallel cyclones.

14. A domestic appliance including the separating apparatus of claim 1, 2, 3 or 4.

15. A cyclonic vacuum cleaner including the separating apparatus of claim 1, 2, 3 or 4.

16. A method of manufacturing a separating apparatus, comprising the steps of:

forming a shroud and a central conduit, the shroud comprising a wall having multiplicity of through-holes; and forming a radially inwardly extending baffle on an inner surface of the wall immediately downstream of the through-holes, wherein in use the at least one radially inwardly extending baffle directs airflow towards the central conduit.

17. The method of claim 16, further comprising configuring the baffle to co-operate with a member associated with another component and bringing together the member and the baffle in order to locate the another component in a predetermined position.

18. The method of claim 17, wherein the predetermined position includes a predetermined orientation.

19. The method of claim 17 or 18, wherein the another component includes a cyclone assembly.

20. The method of claim 16, 17 or 18, further comprising forming the baffle integrally with the shroud.

21. A separating apparatus comprising:

a separating chamber, and a shroud forming an outlet from the separating chamber, the shroud comprising a wall having a multiplicity of through-holes and at least one radially inwardly extending baffle on the inner surface of the wall immediately downstream of the through-holes, wherein the baffle is configured so as to co-operate with a member associated with another component of the separating apparatus to locate the another component in a predetermined position, the another component comprising part of a cyclone assembly.

22. The separating apparatus as claimed in claim 21, wherein the cyclone assembly comprises a plurality of parallel cyclones.

23. A method of manufacturing a separating apparatus, comprising:

forming a shroud comprising a wall having multiplicity of through-holes;

forming a radially inwardly extending baffle on an inner surface of the wall immediately downstream of the through-holes; and configuring the baffle to co-operate with a member associated with another component and bringing together the member and the baffle in order to locate the another component in a predetermined position, wherein the another component includes a cyclone assembly.

* * * * *